United States Patent Office 3,158,596
Patented Nov. 24, 1964

3,158,596
WATER-SOLUBLE ORGANIC DYESTUFFS
Karl Seitz, Allschwil, and Henri Riat, Arlesheim, Switzerland, assignors to Ciba Limited, Basel, Switzerland, a Swiss firm
No Drawing. Filed Sept. 25, 1958, Ser. No. 763,168
Claims priority, application Switzerland Sept. 27, 1957
2 Claims. (Cl. 260—163)

This invention provides valuable new water-soluble organic dyestuffs which contain at least one group imparting solubility in water and the radical of a halogenated aliphatic unsaturated dicarboxylic acid of low molecular weight bound to the dyestuff molecule through one of its two —CO— groups.

As radicals of halogenated dicarboxylic acids there may be mentioned above all the radicals of the formulae

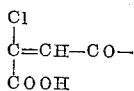

and

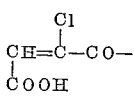

These radicals may be bound through the —CO— group to an aromatic nucleus of the dyestuff molecule directly or advantageously through a nitrogen atom. The nitrogen atom may contain as a further substituent an aliphatic, cycloaliphatic araliphatic or aromatic radical. Especially valuable are those dyestuffs of the present invention which contain at least one group of the formula (1) 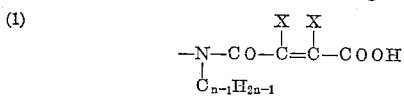

in which one of the two X's represents a chlorine atom and the other X a hydrogen atom, and $n$ is a whole number advantageously 1.

In addition to a group of the aforesaid kind, which may be bound through an —SO$_2$— group or an alkylene radical, or advantageously, to an aromatic ring of the dyestuff molecule, the dyestuffs of the invention contain at least one group imparting solubility in water, for example, a sulfonic acid amide group which may be acylated, a sulfone group or advantageously at least one strongly acid group imparting solubility in water, such as a carboxylic acid or sulfonic acid group. They may also contain further substituents, especially those not imparting solubility in water, such as halogen atoms or nitro, acylamino, alkyl or alkoxy groups.

The group imparting solubility in water and the group derived from a halogenated aliphatic dicarboxylic acid may be distributed in the dyestuff molecule in any manner. Thus a group of each kind may be present in a single component or one dyestuff component may contain the group imparting solubility in water and the other component may contain the group of the Formula 1.

The dyestuffs can be made from dyestuff components which themselves contain the aforesaid halogenated carboxyalkene radial. Such dyestuff components can be made by methods in themselves known, for example, by acylating a suitable compound with a halide or more especially an anhydride of a halogenated unsaturated aliphatic dicarboxylic acid.

Suitable compounds for this purpose are, for example, those which contain an easily acylatable amino group, for example, a monoalkylamino group or a primary amino group, a nitro group or a less easily acylatable primary amino group, and which compounds, after the acylation and, when necessary reduction of the nitro group, serve as diazo- components. The coupling components may likewise contain an easily or less easily acylatable amino group causing coupling or a nitro group or a hydroxyl group causing coupling. As less easily acylatable amino groups there may be mentioned more especially those in a position vicinal to an acid group, for example, a sulfonic acid group. Amino-hydroxy-compounds are acylated in such manner that esterification of the hydroxyl group is avoided, for which purpose, as is known, a non-alkaline reaction medium is suitable. The nitro-compounds are reduced to the amines after the acylation.

Instead of introducing the aforesaid halogenated ω-carboxy-alkene radical into a dyestuff component before the dyestuff is made, it may likewise be introduced into the finished dyestuff. Thus, valuable dyestuffs are obtained by the acylation with chloromaleic anhydride of dyestuffs which contain an acylatable amino group, that is to say an at most secondary or preferably a free amino group.

As soluble organic dyestuffs there may be used dyestuffs belong to a very wide variety of classes, for example, stilbene dyestuffs, azine dyestuffs, dioxazine dyestuffs, xanthone dyestuffs, thioxanthone dyestuffs, acid phthalocyanine dyestuffs and above all acid anthraquinone dyestuffs and especially azo-dyestuffs, including metal-free and metalliferous mono- and poly-azo-dyestuffs. Especially good results are obtained with soluble azo-dyestuffs which possess no pronounced affinity for cotton.

As examples of dyestuffs containing acylatable amino groups, which can be acylated according to the present invention with halogenomaleic anhydride, and especially chloromaleic anhydride, may be mentioned the following: Aminoazo dyestuffs obtainable by hydrolysing acyl-aminoazo dyestuffs, or by reduction of the nitro group of azo dyestuffs containing nitro groups, by coupling diazotized aromatic amines with coupling components containing acylatable amino groups, such as meta-acylamino-aminobenzenes, 1-aminophenyl-3-methyl- or -3-carboxy-5-pyrazolone, aminonaphtholsulfonic acid or the like; amino dyestuffs of the anthraquinone series such as 1-amino-4-(3'- or -4'-aminophenylamino)-anthraquinone-2-sulfonic acid, 1-amino-4-(4'-aminophenylamino)-anthraquinone-2'- or -3'-sulfonic acid, 1-amino-4-(4'-aminophenylamino)-anthraquinone-2:2'- or 2:3'-disulfonic acid, 1-amino-4-(3'-aminophenylamino)-anthraquinone-2:4'-disulfonic acid, 1-amino-4-(4'-aminophenylamino)-anthraquinone-2:3':5-, -2:3':6-, -2:3':7- or -2:3':8-trisulfonic acid, 1-amino-4-(4'-aminophenylamino)-anthraquinone-2:2':5-trisulfonic acid, 1-amino-4-(3'-aminophenylamino)-anthraquinone-2:2':8-trisulfonic acid, furthermore 1:5-dihydroxy-4:8-diaminoanthraquinone-2:6-disulfonic acid, 1:4- or 1:5-diaminoanthraquinone-2-sulfonic acid, 4-, 5- or 8-amino-1-acylaminoanthraquinones (obtained by acylating a 1-aminoanthraquinone that contains a nitro group in the 4-, 5- or 8-position, by means of a sulfo- or disulfo-benzoic acid halide and subsequent reduction of the nitro group to an amino group), aminodibenzanthronesulfonic acid and amino-isodibenzanthronesulfonic acids (obtained by introducing two sulfonic acid groups into amino-dibenzanthrone or into amino-isodibenzanthrone), furthermore, there are obtained, for example, from 1 mol of a tri- or tetrasulfonic acid chloride of a colored anthraquinone derivative, or from 1 mol of a phthalocyanine tri- or tetrasulfonic acid chloride, by partial amidation with 1 mol of a diamine, for example with 1 mol of a diaminobenzenesulfonic acid or of a monoacyl derivative thereof, very valuable dyestuffs suitable as starting materials in the present process which, after hydrolysis of the unreacted sulfonic acid chloride groups and of any acylamino group present, contain an acylatable amino group, which dyestuffs are capable of reacting according to the invention with chloromaleic acid chloride or anhydride.

The acylation according to the invention of such dyestuffs containing an acylatable amino group with a halogenomaleic acid anhydride is advantageously performed in the presence of an acid acceptor such as sodium acetate, sodium hydroxide or sodium carbonate and under relatively mild conditions, for example in an organic solvent, or at a relatively low temperature in an aqueous medium. The chloromaleic anhydride may be replaced with an appropriate dihalide of chloromaleic or chlorofumaric acid, provided it is ensured that only one of the two acid halide groups reacts with the amino group of the dyestuff used, and after formation of the dyestuff the second acid halide group is hydrolysed to the carboxyl group.

The dyestuffs obtained by the process described above are new. They are suitable for dyeing and printing a very wide variety of materials such as wool, silk or superpolyamide fibers, and more especially polyhydroxylated fibrous materials, such as cellulosic materials, which may be either synthetic (e.g. of regenerated cellulose) or natural materials such as cellulose, linen or above all cotton. They are suitable for dyeing by the so-called direct-dyeing method and also for printing and pad-dyeing, more especially from an alkaline aqueous solution—which may be strongly salted, if desired—for example by the process according to which the dyestuff is fixed on the material to be dyed by a heat treatment, for example by steaming, in the presence of an alkali.

The dyeings obtained with the dyestuffs of the invention on wool and on cellulosic fibers are as a rule distinguished by the purity of their tints, by good fastness to light and above all by outstanding fastness to washing.

The following examples illustrate the invention. Unless otherwise indicated, parts and percentages are by weight.

*Example 1*

10.44 parts of the dyestuff of the formula

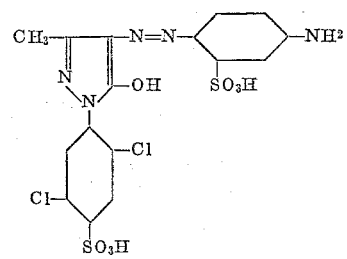

are neutralized in 300 parts of water with sodium carbonate, and 6.56 parts of anhydrous sodium acetate are added. The solution is cooled to 0 to 5° C., a solution of 5.3 parts of chloromaleic anhydride in 25 parts of acetone is run in, and the mixture is stirred until complete acylation of the amino group has been achieved. The solution is then adjusted to pH=9 with sodium carbonate, and the dyestuff formed is salted out with sodium chloride, filtered off and dried in vacuo at 70 to 75° C.

The dyestuff obtained in this manner dyes cotton golden yellow tints of very good fastness to washing and light.

Acylation of the aminoazo dyestuffs in column I of the following table with chloromaleic anhydride as described in Example 1 yields further dyestuffs which dye cotton the tints listed in column II.

| | I | II |
|---|---|---|
| 1 | CH₃-pyrazolone(N-H)-N=N-C₆H₃(SO₃H)-NH₂ | Yellow. |
| 2 | C₆H₄(SO₃H)-N=N-pyrazolone(CH₃, OH, N-phenyl)-NH₂ | Greenish yellow. |
| 3 | NH₂,SO₃H-naphthyl-N=N-C₆H₃(OH)(SO₃H)-NH₂ (with extra NH₂) | Bluish red. |
| 4 | C₆H₄(SO₃H)-N=N-C₆H₃(SO₃H)-N=N-C₆H₄-NH₂ | Yellowish brown. |
| 5 | SO₃H-naphthyl-N=N-C₆H₃(OCH₃)-NH₂ | Yellow. |

| | I | II |
|---|---|---|
| 6 | 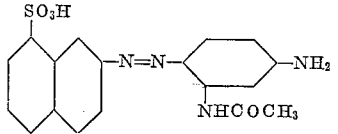 | Do. |
| 7 | 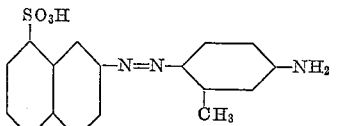 | Do. |
| 8 | 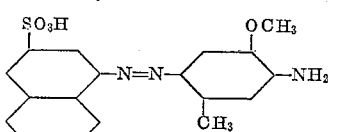 | Yellow-orange. |
| 9 | 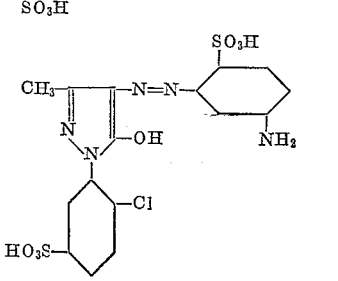 | Greenish yellow. |

*Example 2*

5.18 parts of the dyestuff of the formula

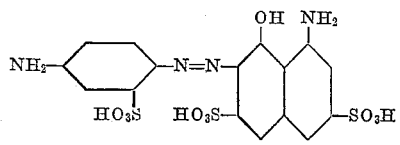

are neutralized in 250 parts of water with sodium carbonate, and 13 parts of anhydrous sodium acetate are added. Addition of 10.6 parts of chloromaleic anhydride brings about complete acylation of the two amino groups. The solution is then rendered weakly alkaline to brilliant-yellow paper with sodium carbonate, and the dyestuff is salted out with 50 parts of sodium chloride.

The dyestuff obtained in this manner dyes cotton violet tints which are fast to washing.

*Example 3*

10 parts of the copper complex of the formula

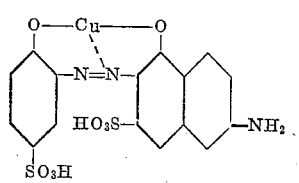

are reacted with 5.3 parts of chloromaleic anhydride as described in Example 1. The acylated dyestuff is salted out with potassium chloride and filtered off.

The dyestuff obtained in this manner dyes cotton ruby red tints.

*Example 4*

8.78 parts of the dyestuff of the formula

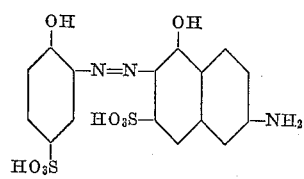

are neutralized in 100 parts of water with sodium carbonate. 2.4 parts by volume of 10 N sodium hydroxide solution and 24 parts by volume of a chromium sodium salicylate solution containing in 100 parts by volume of water 2.8 parts of chromium are added, and the mixture is refluxed for 3 hours. The solution of the resulting 1:2-chromium complex compound is allowed to cool, neutralized with hydrochloric acid and diluted with water to 300 parts by volume. This solution is treated with 6.56 of anhydrous sodium acetate and cooled to 0–5° C. Addition of 5.3 parts of chloromaleic anhydride acylates the amino group completely. The solution is then adjusted to pH=9 with sodium carbonate, and the dyestuff is precipitated with sodium chloride and filtered off.

The dyestuff obtained in this manner dyes cotton reddish blue tints.

*Example 5*

8.78 parts of the dyestuff of the formula

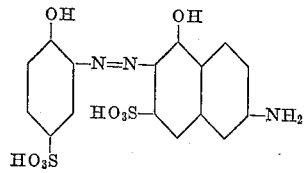

are neutralized in 100 parts of water with sodium carbonate. 2.4 parts by volume of 10 N sodium hydroxide solution and 62 parts by volume of a cobalt sulfate solution of 5% strength are added, and the mixture is heated for ½ hour at 75–80° C. The solution of the 1:2-cobalt complex formed is allowed to cool, adjusted to pH=7 and then reacted with chloromaleic anhydride as described in Example 4.

The dyestuff obtained in this manner dyes cotton violet-brown tints.

*Example 6*

7.78 parts of the dyestuff of the formula

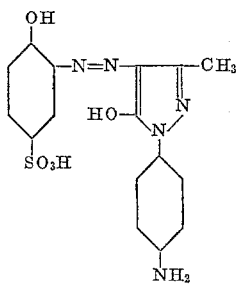

are converted into the 1:2-chromium complex as described in Example 4 and acylated with chloromaleic anhydride. A dyestuff is obtained which dyes cotton orange tints.

*Example 7*

8.18 parts of the dyestuff of the formula

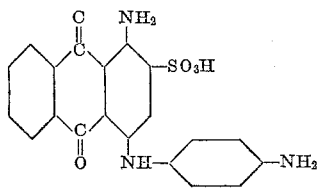

are dissolved together with 5.3 parts of sodium carbonate in 400 parts of water. The solution is cooled to 0–5° C. and 5.3 parts of chloromaleic anhydride are added. One hour later the solution is adjusted to pH=10 with sodium carbonate. Addition of 100 parts of sodium chloride precipitates the acylated dyestuff.

The dyestuff obtained in this manner dyes cotton greenish blue tints.

*Example 8*

By using 7.27 parts of the dyestuff of the formula

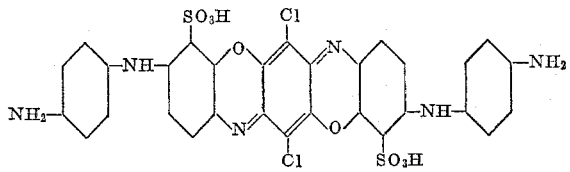

(prepared by the known method, for example as described in U.S. Patent No. 2,763,641, patented September 18, 1956, by Karl Seitz et al.) and acylating the two amino groups with chloromaleic anhydride as described in Example 2, a dyestuff is obtained which dyes cotton blue tints.

*Example 9*

6.4 parts of the condensation product from 1 mol of 2:5-diaminobenzene-1-sulfonic acid and 1 mol of chloromaleic anhydride (prepared as described below) are neutralized in 250 parts of water with sodium carbonate, and diazotized at 0–5° C. in the known manner by adding 6 parts of hydrochloric acid of 30% strength and 10 parts of 2 N sodium nitrite solution.

By coupling with 5-(2':5'-dichlorophenyl) - 3 - methylpyrazolone-4'-sulfonic acid in a medium rendered alkaline with sodium carbonate a dyestuff is formed which dyes cotton golden yellow tints and is identical with the dyestuff obtained as described in Example 1.

By using instead of the dichlorophenyl-methyl-pyrazolone sulfonic acid used above the coupling components listed in column I of the following table, dyestuffs are obtained which dye cotton the tints shown in column II.

|     | I | II |
|-----|---|-----|
| (1) | 1-Acetoacetylamino-2-methoxybenzene | Greenish yellow. |
| (2) | Barbituric acid | Do. |
| (3) | 1-Naphthol-3:6-disulfonic acid | Red. |
| (4) | 2-Acetylamino-5-hydroxynaphthalene-7-sulfonic acid. | Scarlet red. |
| (5) | 1-Benzoylamino-8-hydroxynaphthalene-3:6-disulfonic acid. | Violet. |
| (6) | 1-Hydroxynaphthalene-4-sulfonic acid | Red. |

The above mentioned condensation product from 2:5-diaminobenzene-1-sulfonic acid and chloromaleic anhydride can be prepared thus:

18.8 parts of 2:5-diaminobenzene-1-sulfonic acid are dissolved in 400 parts of water, neutralized and then mixed with 30 parts of anhydrous sodium acetate. To the solution are added 14.57 parts of chloromaleic anhydride in 25 parts of acetone. On completion of the reaction the solution is acidified with hydrochloric acid, and the precipitated reaction product is suctioned off and washed with saturated sodium chloride solution.

*Example 10*

A neutral solution of 18.8 parts of 2:4-diaminobenzene-1-sulfonic acid in 300 parts of water is cooled to 0–5° C. and mixed with a solution of 13.25 parts of chloromaleic anhydride in 25 parts of acetone. The solution is readjusted to pH=7 by the dropwise addition of N-sodium hydroxide solution.

The solution of the resulting condensation product is diazotized in the known manner with 30 parts by volume of hydrochloric acid of 30% strength and 25 parts by volume of 4 N sodium nitrite solution.

Coupling with 1-benzoylamino-8-hydroxynaphthalene-3:6-disulfonic acid in a medium rendered alkaline with bicarbonate produces a dyestuff which dyes cotton bluish red tints.

When the aforesaid 1-benzoylamino - 8 - hydroxynaphthalene-3:6-disulfonic acid is replaced with 5-(2':5'-dichlorophenyl) - 3 - methylpyrazolone - 4'-sulfonic acid or with barbituric acid as coupling component, dyestuffs are obtained which dye cotton greenish yellow tints.

By using 6-ureido-1-hydroxynaphthalene-3-sulfuric acid as coupling component there is obtained a dyestuff that dyes cotton pure orange tints that are fast to washing.

*Example 11*

31.9 parts of 1:8-aminonaphthol - 3:6 - disulfonic acid are dissolved in 500 parts of water, neutralized with sodium hydroxide and mixed with 30 parts of anhydrous sodium acetate. 14.57 parts of chloromaleic anhydride in 25 parts of acetone are added at room temperature. When a free amino group can no longer be detected, another 30 parts of sodium acetate are added, and the diazo compound prepared from 17.3 parts of 2-aminobenzene-1-sulfonic acid is run in.

The dyestuff obtained in this manner dyes cotton red tints.

By using, instead of 2-aminobenzene-1-sulfonic acid, 3-aminobenzene-1-sulfonic acid or 4-aminobenzene-1-sulfonic acid, there are obtained dyestuffs which yield somewhat more bluish tints.

In this example there may be used, instead of chloromaleic anhydride, the corresponding quantity of bromomaleic anhydride. A dyestuff having very similar properties is obtained.

Example 12

23.9 parts of 2-amino-5-hydroxynaphthalene-7-sulfonic acid in 500 parts of water are neutralized with sodium hydroxide and mixed with 30 parts of sodium acetate. The solution is cooled to 0–5° C. and 14.57 parts of chloromaleic anhydride are added. When the amino group has been completely acylated, 40 parts of sodium bicarbonate are added to the solution and coupling with the diazo compound from 17.3 parts of 2-amino-benzene-1-sulfonic acid is performed.

A dyestuff is obtained which dyes cotton orange tints that are fast to washing.

By using 5-acetylamino-2-aminobenzene-1-sulfonic acid as diazo-compound, a dyestuff is obtained which dyes cotton scarlet tints.

By using 2-aminonaphthalene-5:7-disulfonic acid as diazo-component a dyestuff is obtained that dyes cotton red-orange tints.

By using 1-amino-diphenyl-2-sulfonic acid a dye-stuff having similar properties is obtained.

Example 13

12.65 parts of 2-methylamino-5-hydroxynaphthalene-7-sulfonic acid in 100 parts of water are neutralized with sodium carbonate and mixed with 15.9 parts of chloromaleic anhydride. The solution is rendered neutral again by the dropwise addition of N-sodium hydroxide solution. 15 parts of sodium bicarbonate are added, and the diazonium salt solution prepared from 8.65 parts of 2-aminobenzene-1-sulfonic acid is run in.

The dyestuff obtained in this manner dyes cotton orange tints.

In this example the chloromaleic anhydride may be replaced by the corresponding quantity of bromomaleic anhydride, and a dyestuff having similar properties is obtained.

Example 14

2 parts of the dyestuff obtained as described in Example 7 are mixed with 20 parts of urea, dissolved in 26 parts of water, and then stirred into 50 parts of an alginate thickening of 4% strength. 2 parts of sodium carbonate are added, and the resulting printing paste is used for printing a cotton fabric on a roller printing machine.

The fabric printed in this manner is dried, steamed for 8 minutes at 100 or 101° C., rinsed, soaped at the boil for 15 minutes in a solution of 0.3% strength of a non-ionic detergent, rinsed and dried.

A blue print is obtained which is fixed fast to boiling. By using a fabric of staple fibers of regenerated cellulose, instead of a cotton fabric, a similarly good result is achieved.

Example 15

3 parts of the dyestuff obtained as described in Example 11 are dissolved in 100 parts of water at 50° C. A cotton fabric is impregnated with the resulting solution, and dried. The fabric is then impregnated with a solution at 20° C. containing, per liter, 10 grams of sodium hydroxide and 300 grams of sodium chloride, the fabric is then squeezed until it retains 75% of its weight of the solution, then steamed for 60 seconds at 100–110° C., rinsed, treated in a sodium bicarbonate solution of 0.5% strength, rinsed, soaped for ¼ hour in a solution of 0.3% strength of a non-ionic detergent at the boil, rinsed and dried. There is obtained a red dyeing fixed fast to boiling.

What is claimed is:

1. A water-soluble monoazo dyestuff which contains at least one sulfonic acid group and corresponds to the formula

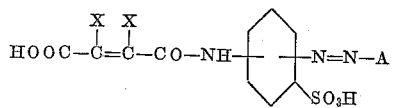

wherein A represents 3-methyl-5-pyrazolonyl bound in its 4-position to the azo linkage, one of the two X's is a chlorine atom and the other X is a hydrogen atom.

2. The dyestuff which in its free acid state corresponds to the formula

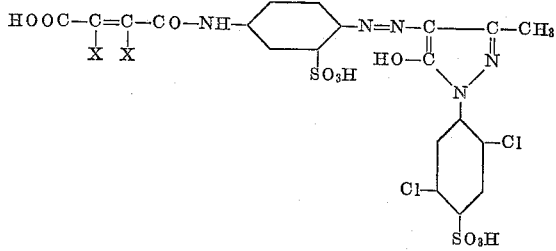

wherein one of the two X's is a chlorine atom and the other X is a hydrogen atom.

References Cited in the file of this patent

UNITED STATES PATENTS

| | | |
|---|---|---|
| 901,675 | Boniger | Oct. 20, 1908 |
| 2,155,001 | Schmid | Apr. 18, 1939 |
| 2,195,784 | Schmid | Apr. 2, 1940 |
| 2,195,787 | Schmid | Apr. 2, 1940 |
| 2,794,032 | Frey et al. | May 28, 1957 |

FOREIGN PATENTS

| | | |
|---|---|---|
| 654,849 | Germany | Dec. 31, 1937 |
| 209,973 | Switzerland | Aug. 16, 1940 |
| 216,416 | Switzerland | Dec. 1, 1941 |
| 220,120 | Switzerland | June 16, 1942 |